(12) United States Patent
Prigent

(10) Patent No.: US 7,292,314 B2
(45) Date of Patent: Nov. 6, 2007

(54) EXPOSURE DEVICE WITH SPATIAL LIGHT MODULATOR AND NEUTRAL DENSITY FILTERS

(75) Inventor: Thierry Prigent, Saint-Helene (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/556,876

(22) PCT Filed: May 3, 2004

(86) PCT No.: PCT/EP2004/004635

§ 371 (c)(1),
(2), (4) Date: Nov. 15, 2005

(87) PCT Pub. No.: WO2004/102268

PCT Pub. Date: Nov. 25, 2004

(65) Prior Publication Data

US 2006/0221321 A1    Oct. 5, 2006

(30) Foreign Application Priority Data

May 16, 2003 (FR) .................................. 03 05845

(51) Int. Cl.
*G03B 27/54* (2006.01)
*G03B 27/72* (2006.01)
(52) U.S. Cl. .......................................... 355/67; 355/69
(58) Field of Classification Search ................ 355/67, 355/69
See application file for complete search history.

(56) References Cited

U.S. PATENT DOCUMENTS

| 3,754,823 | A | | 8/1973 | Simmon et al. | |
|---|---|---|---|---|---|
| 4,461,984 | A | * | 7/1984 | Whitaker et al. | ........... 318/687 |
| 4,931,863 | A | | 6/1990 | Tokuda | |
| 4,935,820 | A | * | 6/1990 | Patel et al. | .................. 358/302 |
| 5,635,976 | A | * | 6/1997 | Thuren et al. | ............... 347/253 |
| 5,995,202 | A | | 11/1999 | Itoh et al. | |
| 6,407,767 | B1 | * | 6/2002 | Klees et al. | ................. 347/241 |
| 6,504,943 | B1 | * | 1/2003 | Sweatt et al. | ............... 382/103 |
| 6,870,523 | B1 | * | 3/2005 | Ben-David et al. | ........... 345/84 |

FOREIGN PATENT DOCUMENTS

| EP | 1 186 943 | 3/2002 |
|---|---|---|
| WO | 89/03062 | 4/1989 |
| WO | 98/04957 | 2/1998 |
| WO | 01/13174 | 2/2001 |

\* cited by examiner

*Primary Examiner*—Diane Lee
*Assistant Examiner*—Chia-how Michael Liu
(74) *Attorney, Agent, or Firm*—William R. Zimmerli

(57) ABSTRACT

Exposure device for writing mixed data onto a photosensitive support comprising: a light source (10), supplying an exposure light; a first two-dimension pixel matrix modulator (50), and a neutral optical filter means (12) having at least two different optical densities, the modulator and the filter being arranged in series on an optical path of the exposure light coming from the source (10). Application to motion picture cameras.

10 Claims, 2 Drawing Sheets

EXPOSURE DEVICE WITH SPATIAL LIGHT MODULATOR AND NEUTRAL DENSITY FILTERS

TECHNICAL FIELD

The present invention relates to an exposure device for writing mixed data onto a photosensitive support, and especially onto a film.

Mixed data means data that comprises at the same time sensitometry controls, and at least one other data form, such as images, characters, codes etc. The sensitometry controls are formed of several ranges of the photosensitive support, having various optical densities. The ranges are obtained by exposing the support with various exposure energies.

The sensitometry controls can be used to determine the sensitometry curve of the photosensitive support. The sensitometry curve enables each density value of the photosensitive support to be linked to an exposure value, i.e. to a quantity of light received. It is particularly useful for adjusting photosensitive support processing apparatus or image reproduction apparatus. In particular the sensitometry controls enable changes during the response to light of the photosensitive support to be reported. These changes result for example, from aging. The sensitometry controls, written on a small part of the photosensitive support, are indeed subject to the same conservation conditions as the rest of the support.

The second type of data comprises codes, such as barcodes, images, logos, or alphanumeric characters. These data are called "readable data" insofar as they can be read by a user or by using appropriate equipment such as a barcode reader.

Unlike sensitometry controls, this is data whose content is independent of aging or alteration of the photosensitive support. The readable data can supply information such as a commercial brand, data on the type of film, the name of a director, the identification number of a scene, or a date. This list is far from being complete.

The invention especially applies to the fields of medical imaging and the cinema. For example, the invention can be used, in motion picture matters, to show information useful to postproduction on strips of film.

STATE OF THE PRIOR ART

An illustration of the state of the art is provided with reference to the following documents: U.S. Pat. Nos. 6,407, 767; 5,694,450 and FR 2221752.

These documents highlight the constraints linked to writing on a photosensitive support the two types of data mentioned above.

The writing of readable data requires equipment capable of modulating the exposure light with sufficient spatial resolution to reproduce the characters or images recognizable by a user or ad hoc reading apparatus. Therefore, an electrically addressable liquid crystal display (LCD) module can be used.

However, the writing of sensitometry controls requires more accurate control of the exposure energy, and for a very wide energy range. Photosensitive supports, and in particular films, have indeed a very wide sensitivity range. The sensitivity range can be taken as the range of exposure energy going from the support's minimum density to a maximum density.

The ratio between the minimum energy necessary to write on the support, and the maximum energy having an influence on the writing, can reach values $10^4$-$10^6$, according to the support type.

Light modulators such as the liquid crystal displays proposed for writing readable data have an energy modulation range of about 100. In other words, there is ratio of 100 between the energy received from a "white" pixel and that received from a "black" pixel.

These modulators therefore seem unsuitable for the writing of sensitometry controls.

One may observe that known devices for exposing films can be classified into two categories according to whether they are intended for writing readable data or sensitometry controls. Some equipment, planned to record mixed data, include an exposure device of each category.

Such equipment is bulky and is reserved for use in an industrial environment for the production of photosensitive supports. However, the volume, or at least the overall dimensions, constitutes an obstacle to their integration into cameras, and especially into motion picture cameras.

SUMMARY OF THE INVENTION

The object of the invention is to propose a unique exposure device for writing mixed data onto a photosensitive support, and especially onto a film.

One object is to propose such a device capable of producing sensitometry controls with an exposure range sufficient for exploring the support's entire sensitivity range.

Another object is to propose a device capable of being integrated into a camera.

To achieve these objects, the invention relates more precisely to an exposure device for writing mixed data onto a photosensitive support comprising:

a light source, supplying an exposure light,
a first two-dimension pixel matrix modulator, and
a neutral optical filter means having at least two different optical densities, the modulator and the filter being arranged in series on an optical path of the exposure light coming from the source.

Photosensitive support means any support capable of being written on for recording an image. This can be for example a photographic support such as a film or an X-ray plate.

As the invention targets more particularly applications in the field of cameras, the following text refers to photographic film. However, the use of the term "film" should not be understood as a limitation of the invention to this support type only.

The invention device enables the writing of readable data onto the film by means of a pixel matrix modulator. It is a two-dimension spatial modulator such as, for example, a liquid crystal cell or a micromirror cell. The modulator, linked to the exposure light source constitutes a projector capable of projecting an image onto the film. The image is determined by the control addressing of the modulator. An addressing signal carrying data to be written onto the film is supplied for this purpose to the modulator by a control unit or computer. As previously mentioned, the data include, for example, alphanumeric characters, pictograms, logos, or others.

The modulator can also receive a signal commanding the projection of uniform exposure ranges with various energies. Each exposure range preferably corresponds to several adjacent pixels of the modulator that let the same light energy pass. In the case of a modulator comprising a liquid crystal cell, each range corresponds to a zone of uniform density of the cell. In this operating mode the modulator can be used to form sensitometry controls on the film.

The optical filter means, preferably neutral, is then used in combination with the modulator to extend the range of exposure energies capable of being transmitted to the film.

In the main the filter's function is to reduce the light intensity for all or part of the exposure ranges projected onto the film. If necessary, the light intensity of the parts containing readable data is also affected by the filter means. The filter means can reinforce the attenuation of the light also obtained by the modulator. It has at least two density values. A first value of very low density only attenuates the light intensity very little, or even not at all. One or more other density values provide stronger attenuation.

The filter means can comprise several filters or several filter parts that respectively affect two or more exposed regions. In a particular embodiment, the filter means can comprise a filter with four zones, or four quadrants with different densities. Optical means are then provided to respectively project the light that has crossed the four quadrants in four separate regions of the film. Such a filter means, taken in combination with the modulator, if necessary, enables the whole range of film sensitivity to be covered in one exposure. The various filter parts can be replaced by a single filter having a density gradient.

As a variant, the filter means can also comprise one or more filters and a mechanism to selectively insert one of the filters into the optical path of the exposure light. Then this one receives all the exposure light. A single non-zero density filter can be used with the mechanism. Then the mechanism enables the single filter to be inserted or not and two density values to be obtained, one zero value and one non-zero value. However, it is preferable to have several filters of different density. In this case, several exposures, each time using a different filter density, are necessary to cover the whole range of the film's sensitivity.

According to another option, the filter means can comprise a shutter. In this case, attenuation of the exposure is obtained not by acting on the light intensity received by the film but on the exposure time. Each shutter speed is then equivalent to an optical density. A shutter with variable closing time in a ratio of 1 to 1000 represents the equivalent of filter ranges with variable density from 0 to 3.

Because they are connected in series, light coming from the exposure source crosses both the filter means and the modulator. Thus the optical density of these two elements adds up to filter the light.

The filter means is preferably used as a means of adjusting an exposure gauge. In other words, the difference between the various densities of the filter means is relatively large. Rough adjustment of the exposure energy of the film is thus done by choosing a density of the filter means, and fine adjustment is performed by the modulator. It is indeed possible to adjust the density values of the modulator very finely. With an 8-bit command, a modulator generally enables a hundred gray levels regularly distributed between minimum and maximum density values to be distinguished.

One of the characteristics of the modulators is their practical dynamics. This is the maximum difference of density obtained between two ranges of the modulator receiving separate addressing. The density difference that exists moreover between successive density values of the filter means is chosen with the order of size of the modulator's practical dynamics. Preferably it is chosen slightly lower than the modulator's practical dynamics. This enables a certain "coverage" and avoids certain exposure values not being obtained by any combination of the filter means and the modulator.

For example, if the modulator has practical dynamics of two density units, i.e. a ratio from 1 to 100 between the energy of a black pixel zone and a white one, and if, moreover, the densities of the filter means have respectively a pitch advance of two density units, it is possible to continuously adjust the exposure energy in a range going from 1 to $10^{2N}$. This is a range of 0 to 2N density units. N is the number of filters of the filter means, or the number of filter ranges. Here the boundary case is considered, without coverage, where the density values of the filter means have density differences of two units exactly. Remember that density units are defined as the decimal logarithm of the ratio between light energy received and the light energy transmitted. Thus one density unity separates two filters such that one has a density ten times greater than the second does.

Practically, and as mentioned above, the use of a filter means with density differences less than the modulator's practical dynamics, is preferred to provide for value coverage. In other words, the filter means has density differences preferably less than the maximum modulation range of the modulator, but close to it. The density differences extend between the closest densities.

The light source can be a continuous or pulsed source such as a flash.

To obtain the widest possible exposure range, the power of the source is preferably chosen sufficiently so that a beam's light energy having crossed the filter means and the modulator in their strongest density configuration is not zero. Ideally, this transmitted minimum energy is in the order of size, by lowest value, of the minimum energy required to write the film.

Other characteristics and advantages of the invention will appear in the following description, with reference to the figures of the appended drawing. This description is given purely as an illustration and is not limiting.

DETAILED DESCRIPTION OF THE MODES OF IMPLEMENTING THE INVENTION

In the following description, identical, similar or equivalent parts of the various figures are marked by the same reference signs, to avoid repeating their description. Furthermore, the various parts of the figures are represented free scale, for figure clarity purposes.

Figure 1:
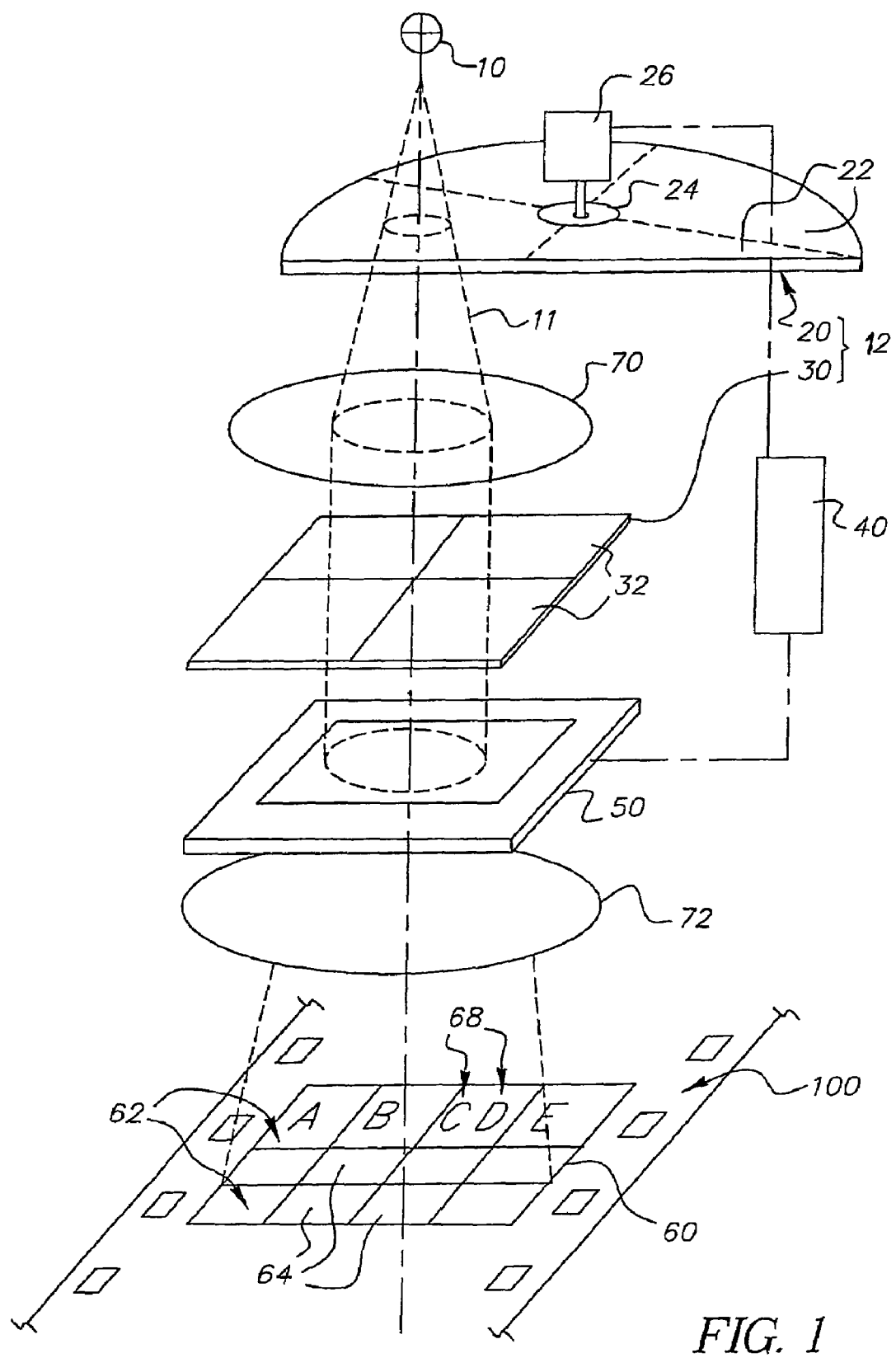
FIG. 1, is a diagrammatic illustration showing an exposure device according to the invention.

The device of FIG. 1 comprises a light source 10. It is for example a lamp or array of red, green and blue LEDs (electroluminescent diodes). The LED array can be linked to a light diffuser or integrator. Compared with a lamp, it enables the color temperature to be controlled more easily. The light source 10 delivers an exposure light that follows an optical path as far as the photosensitive support 100. The support 100 is, in this case, a motion picture film.

The device is also comprises a filter means 12, arranged on the lights optical path. In the example illustrated, the filter means has two separate pieces of equipment. It is, on the one hand, a mechanism in the form of a filter wheel 20, and, on the other hand, a quadrant filter 30. These two pieces of equipment 20, 30 have the same light attenuation function. They can be used in combination, as the figure shows, or separately. In other words, one of the pieces of equipment 20, 30 could be deleted.

The filter wheel 20 has several filters 22 that can be inserted each in turn into the optical path of the exposure light. Each filter 22 preferably has a uniform density and fully intercepts a beam 11 coming from the source 10. The filters 22 have densities complying with a progression of about one or two density units, so that two consecutive filters have attenuation differences from 10 to 100. The wheel is mounted on a shaft 24 moved by a small step motor 26, so as to insert one of the filters into the optical path. The rotation of the motor is controlled by a control unit 40. The filters can also be moved by a simple electromagnet.

The second piece of equipment of the filter means 12 is a filter 30 having several filter parts 32 of different density. The filter 30 is arranged permanently on the optical path so that one part of the light beam 12 crosses each filter part. The main difference between the filter 30 and the filter wheel 20 relates to the fact that the filter parts are immobile and only intercept one part of the light beam.

The reference 50 shows a light modulator also arranged on the optical path, so as to intercept the beam 11. In the illustrated example, the modulator is a liquid crystal cell. It can be replaced by a micromirror modulator. As required, the modulator can be used in transmission or reflection.

The modulator used in transmission is also controlled by the control unit 40. This supplies line and column addressing to control the cell's pixel display state. The pixels, not shown, enable a projection image to be formed comprising readable data. Several adjacent pixels receiving the same command can also form a uniform density zone. This can then be used as a filter zone, to form a sensitometry control range.

The density of the filter zones, formed by electrical addressing of the cell, can be adjusted very exactly in the cell's gray range. Many zones having a regular density progression (gray) can be displayed so as to fully cover the cell's gray range.

The light that crosses the modulator is projected onto the film 100 so as to write on it. The projected exposure image is shown with the reference 60. Globally it has four quarters 62 that correspond to the four filter parts 32 of the filter 30. It also has uniform light energy exposure ranges 64 enabling a sensitometry control to be formed. Finally the image has readable signs such as writing characters 68.

A large number of different combinations to command the filter wheel and the modulator can be selected. The form and distribution of the exposure ranges 64 can be modified, to turn or not the filter wheel between successive film exposures, to move or not the film, to combine or not readable data and sensitometry controls in the same image, etc.

To facilitate the reading of readable data, these are projected with a light beam or part of a light beam that has not crossed the very dense zones of the filter means.

Further, the optical path of the light from the source to the film can be suited to the dimensions of the equipment in which the device has to be integrated.

References 70 and 72 designate lenses or lens assemblies intended to form a light beam from the source, and to project the exposure image of the modulator onto the film. It is preferable that the part of the beam crossing the modulator is a parallel beam part. However, the arrangement and type of lenses or lens assemblies can be suited to other configurations that those of the device illustrated on FIG. 1. Finally, it is useful to note that the order of the modulator and the filter means along the optical path can also be different from that illustrated on FIG. 1.

A device according to the invention constituting a variant of the FIG. 1 device is described with reference to FIG. 2. The FIG. 2 device comprises an exposure light source 10 and, in an order corresponding to the light propagation, a lens 70, a filter means 12, a modulator 50, and a collimator 72. The collimator forms the image of the modulator onto a film 100.

The above elements are not described further here, insofar as they are similar or equivalent to those already mentioned with reference to FIG. 1. The filter means 12 contains for example a shutter with variable closing time.

A semi-transparent mirror 80 is arranged between the modulator 50 and the collimator 72. In this particular case, this is a blade with parallel faces oriented at an angle of 45° to the device's optical axis. The mirror is used to direct a fraction of the light coming from the modulator 50 towards a collector 82. The light fraction is, for example, about 5-20%. A sensor 84, placed inside the collector 82 receives the light from the mirror 80 and measures its intensity. The sensor 84 comprises, for example, a photodiode, a CCD, or, in a more sophisticated way, a spectrophotometer.

The sensor's role is to deliver a signal representative of the quantity of light, i.e. the exposure energy that effectively reaches the film 100. This relates to the fact that the quantity of light derived from the optical path by the semi-transparent mirror 80 is proportional to the quantity of light that reaches the film.

The sensor's signal is used in a feedback control loop 88 of the light energy delivered by the source 10. The feedback control loop is symbolized by an arrow on the figure. The signal of the sensor 84 is directed towards an electric power supply 86 of the light source in order to adjust the electrical energy supplied to the source according to the exposure energy to be transmitted to the film for forming sensitometry control ranges. The sensor's signal is compared with a set value and the result of the comparison is used to control the energy to be supplied to the light source. The set value is fixed according to the film's sensitivity. It can also be adjusted. When the feedback control loop 88 is calibrated, phenomena such as film aging can be compensated for and the energy supplied to the source 10 can be adjusted accurately according to the film's characteristics.

A control unit 40, already mentioned with reference to FIG. 1, is used here to control the filter means, the modulator and the source's electric power supply at the same time. It thus enables all the control parameters of the light energy directed towards the film to be acted upon.

Figure 2:
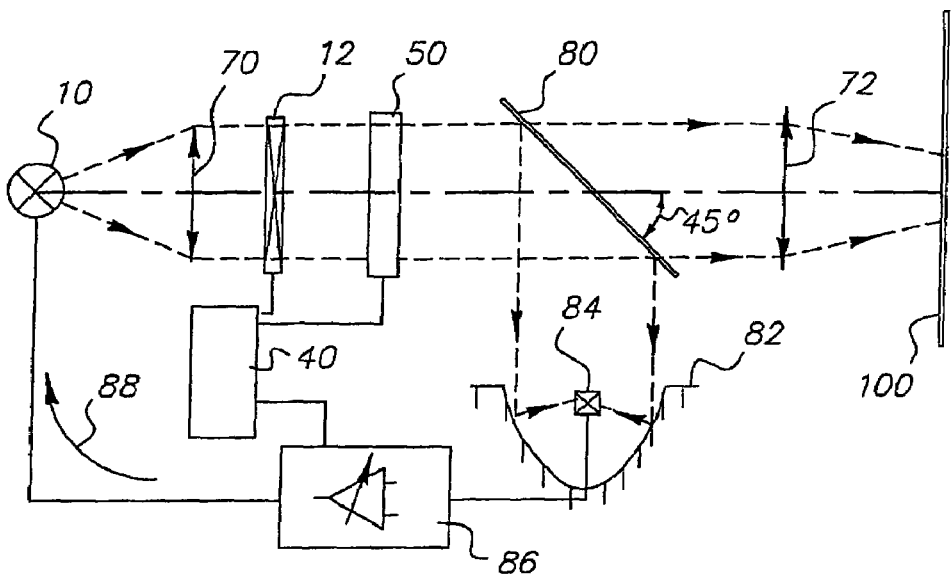
FIGS. 2 and 3 are illustrations of other exposure devices according to the invention, constituting variants of the device of FIG. 1.

In the FIG. 2 device, the filter means fully intercepts the exposure beam 11 coming from the source. This enables the use of a very simple sensor 84 that collects all the light energy diverted with the mirror 80 and that integrates it.

As shown above, the order of the components of the exposure device can be very variable. Therefore FIG. 3 illustrates yet another embodiment possibility of the device.

Figure 3:
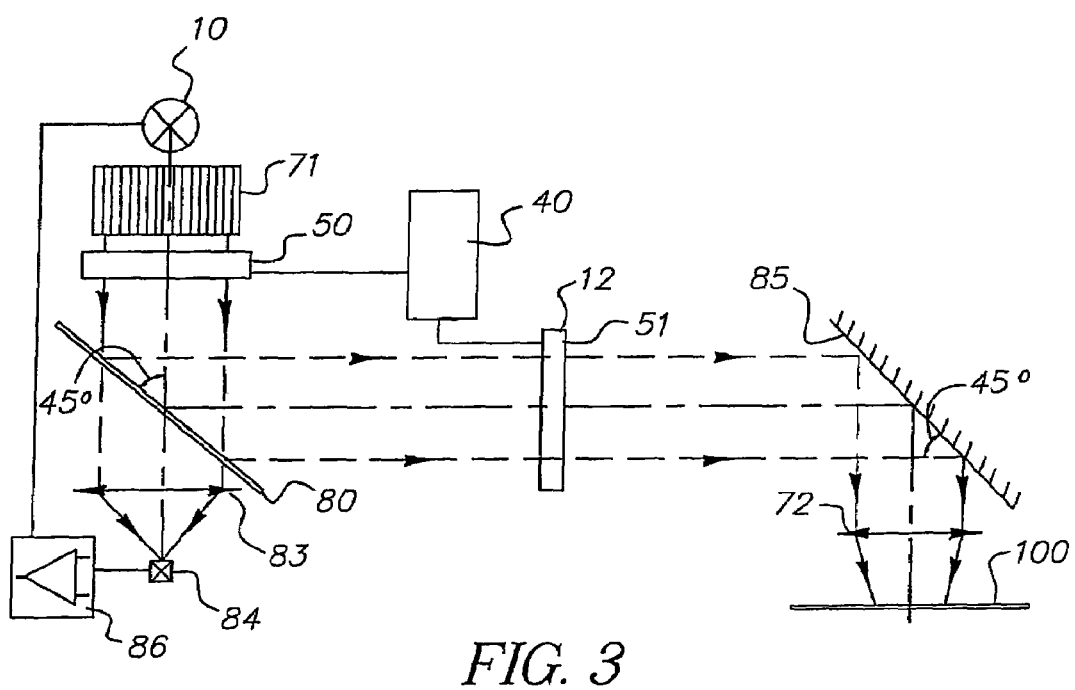

The FIG. 3 device comprises, in order: the light source 10, an integrator tube 71, a modulator 50, a semi-transparent mirror 80, a second modulator 51, a fold mirror 85 and a collimator 72.

The integrator tube 71 has the same function as the lens 70 of FIG. 2. This is to form a beam of parallel light. Although this characteristic is not essential, it greatly simplifies the control of the modulator 50. The integrator tube is formed from one or more elementary tubes whose length is greater than the cross-section. The length, for example, equals ten times the cross-section.

The sensor 84, used for the feedback control of the light source 10, is arranged in the optical axis of the integrator tube and receives part of the light of the parallel beam that crosses the semi-transparent mirror 80. Another part of the light is reflected in the direction of the second modulator 51.

Unlike the semi-transparent mirror of the FIG. 2 device, whose reflection coefficient is about 5-20%, the reflection coefficient of the semi-transparent mirror of the FIG. 3 device is about 80-95%. Thus, a low proportion of the light only reaches the sensor 84. However, this is proportional to the light that finally reaches the film 100. The sensor 84 is arranged inside a lens 83 whose role is similar to that of the light collector 82 of the FIG. 2 device.

Returning to FIG. 3, it may be observed that the film extends in a plane perpendicular to the optical axis of the second modulator 51. A fold mirror 85, arranged at 45° to the optical axis is indeed provided to direct the light towards the film.

In this embodiment, the second modulator 51 constitutes the filter means. It is identical to the first modulator 50, and is also controlled by the control unit 40. When different exposure images are produced on the film, the second modulator can be controlled to have a uniform but different density during each exposure. The second modulator can also be controlled to present ranges with different density values. In this case its use is similar to that of the quadrant filter of FIG. 1.

The arrangement of the elements, as well as the angles that the mirrors form in relation to the optical axes, can be modified to a large extent. This enables the device to be suited to different camera equipment, and, for example, to be housed in a camera.

The invention claimed is:

1. Exposure device for writing mixed data onto a photosensitive support comprising:
   a light source, supplying an exposure light,
   a first two-dimension pixel matrix modulator, and
   a neutral optical filter means having at least two different optical densities, the modulator and the filter being arranged in series on an optical path of the exposure light coming from the source,
   wherein the filter means comprises at least two optical filters with different optical density, and a mechanism to selectively insert one of the filters into the exposure light's optical path, and
   wherein each optical filter of the filter means has a uniform density.

2. A device according to claim 1, wherein the filter means has density differences less than or equal to a maximum modulation range of the modulator.

3. A device according to claim 1, wherein the filter means comprises a filter having at least two filter ranges with respectively at least two different optical densities, each filter range receiving part of the exposure light.

4. A device according to claim 1, wherein the filter means comprises a density gradient filter.

5. A device according to claim 1, wherein the filter means comprises at least two optical filters with different optical density, and a mechanism to selectively insert one of the filters into the exposure light's optical path.

6. A device according to claim 1, wherein the filter means comprises a shutter.

7. A device according to claim 1, wherein the modulator is a liquid crystal modulator.

8. A device according to claim 1, wherein the modulator is a micromirror modulator.

9. A device according to claim 1, wherein the filter means comprises a second two-dimensional pixel matrix modulator.

10. A device according to claim 1, also comprising a feedback control loop of the source's light energy.

* * * * *